(12) United States Patent
Solfrank et al.

(10) Patent No.: US 8,622,622 B2
(45) Date of Patent: Jan. 7, 2014

(54) ANTIFRICTION BEARING

(75) Inventors: Peter Solfrank, Frensdorf (DE);
Christian Schaefer, Nuremberg (DE);
Christopher Mitchell, St. Austell (GB);
Heiko Schmidt, Muehlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 566 days.

(21) Appl. No.: 12/780,393

(22) Filed: May 14, 2010

(65) Prior Publication Data
US 2010/0290728 A1 Nov. 18, 2010

(30) Foreign Application Priority Data
May 16, 2009 (DE) .......................... 10 2009 021 641

(51) Int. Cl.
F16C 19/06 (2006.01)
F16C 33/38 (2006.01)
F16C 1/24 (2006.01)
F16C 33/66 (2006.01)

(52) U.S. Cl.
CPC ......... F16C 33/6614 (2013.01); F16C 33/6629 (2013.01); F16C 33/6651 (2013.01)
USPC ........... 384/470; 384/462; 384/523; 384/534; 384/572; 384/606

(58) Field of Classification Search
USPC ......... 384/462, 470, 473, 490, 523, 528, 534, 384/572, 606
See application file for complete search history.

(56) References Cited

U.S. PATENT DOCUMENTS

| | | | | |
|---|---|---|---|---|
| 2,742,332 A * | 4/1956 | Cobb | | 384/462 |
| 3,539,231 A * | 11/1970 | Langstrom | | 384/470 |
| 3,597,031 A * | 8/1971 | Bill | | 384/470 |
| 3,743,369 A * | 7/1973 | Langstrom | | 384/470 |
| 4,568,206 A * | 2/1986 | Imazaike | | 384/530 |
| 5,584,583 A * | 12/1996 | Hidano | | 384/470 |
| 6,206,575 B1* | 3/2001 | Matsushita et al. | | 384/573 |
| 6,461,049 B2* | 10/2002 | Straub et al. | | 384/572 |
| 7,114,852 B2* | 10/2006 | Compassi | | 384/470 |
| 7,507,028 B2* | 3/2009 | Markle | | 384/523 |
| 7,771,122 B2* | 8/2010 | Nagai | | 384/572 |
| 2003/0026509 A1 | 2/2003 | Yakura | | |
| 2003/0098182 A1 | 5/2003 | Ehler | | |
| 2010/0142874 A1* | 6/2010 | Doyer et al. | | 384/523 |

FOREIGN PATENT DOCUMENTS

| | | |
|---|---|---|
| DE | 103 43 881 | 4/2005 |
| JP | 2005090658 A | 4/2005 |
| JP | 2008157441 A * | 7/2008 |
| WO | 2008090295 A2 | 7/2008 |

* cited by examiner

Primary Examiner — Marcus Charles
(74) Attorney, Agent, or Firm — Lucas & Mercanti, LLP

(57) ABSTRACT

An antifriction bearing for a turbocharger, which has an outer ring with an annular inner face and an inner ring with an outer face which is parallel to the inner face, and a rolling body cage with a single annular part arranged radially between the outer and inner ring with one cage guiding face which is parallel to the inner face of the outer ring and an inner surface which is parallel to the outer face of the inner ring, and with closed rolling body pockets which are distributed over the circumference and rolling bodies received in the pockets. To provide hydraulic damping and reduced friction, the annular part is provided in the region of the cage guiding face with at least one radial recess outside the rolling body pockets, which can be formed by apertures, cutouts or grooves in the cage guiding face.

14 Claims, 4 Drawing Sheets

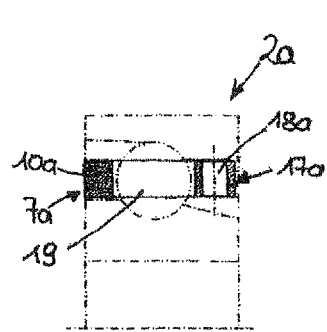
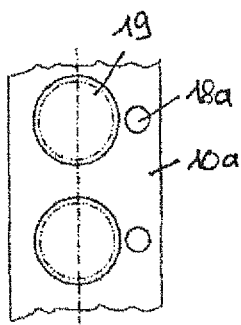
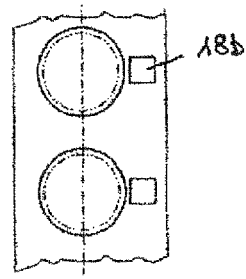
Figure 2a  Figure 2b  Figure 2c
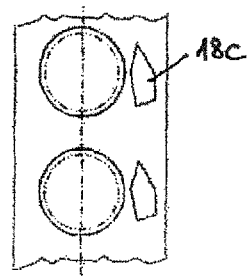
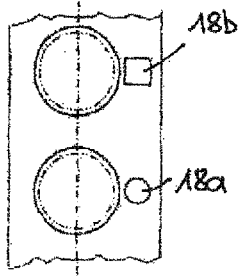
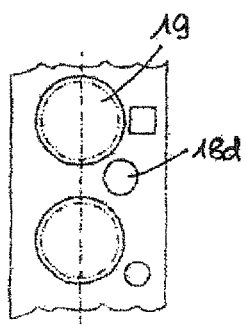
Figure 2d  Figure 2e  Figure 2f
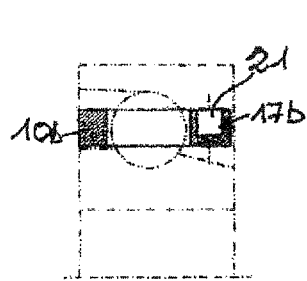
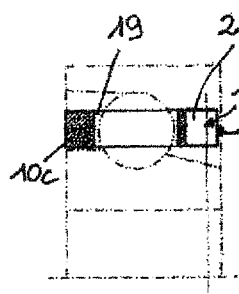
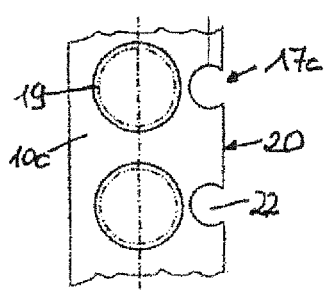
Figure 3  Figure 4a  Figure 4b

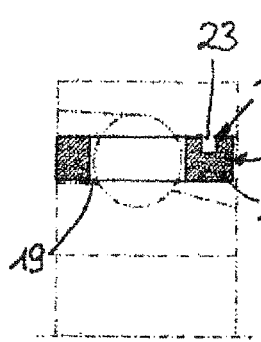
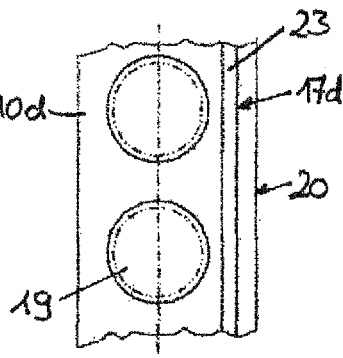
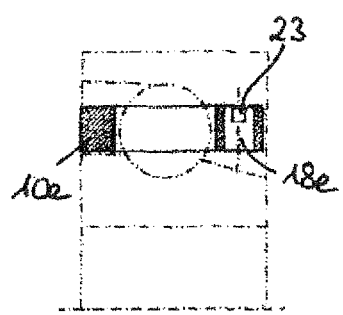
Figure 5a　　　　Figure 5b　　　　Figure 6a
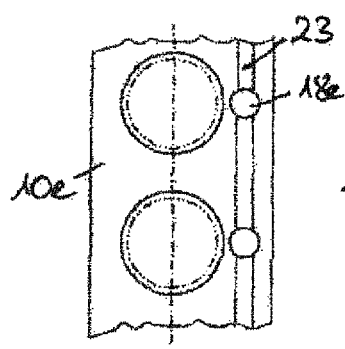
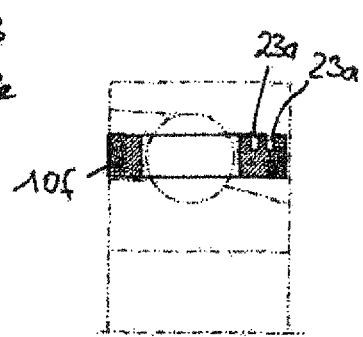
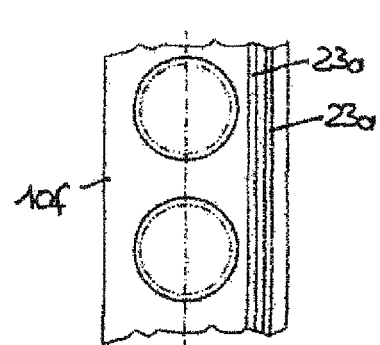
Figure 6b　　　　Figure 7a　　　　Figure 7b
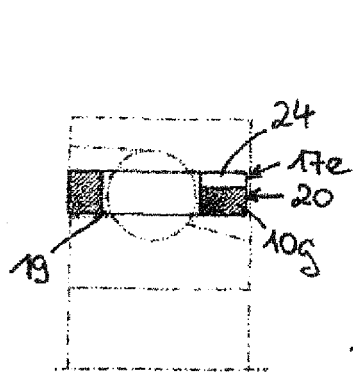
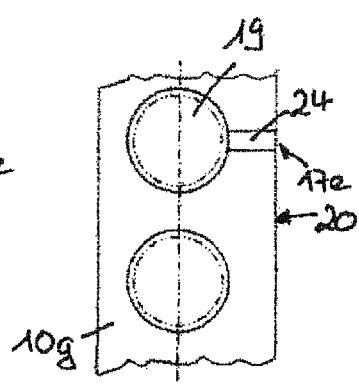
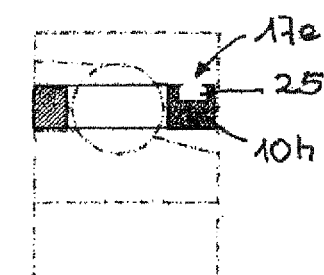
Figure 8a　　　　Figure 8b　　　　Figure 9a

ANTIFRICTION BEARING

This application claims the priority of DE 10 2009 021 641.3 filed May 16, 2009, which is incorporated by reference herein.

FIELD OF THE INVENTION

The invention relates to an antifriction bearing, in particular for a turbocharger, having an outer ring with an annular inner face and an inner ring with an outer face which is parallel to the inner face, and a rolling body cage comprising a single annular part which is arranged radially between the outer ring and the inner ring with in each case one cage guiding face which is parallel to the inner face of the outer ring and an inner surface which is parallel to the outer face of the inner ring, and with closed rolling body pockets which are distributed over the circumference and rolling bodies which are received in the rolling body pockets.

BACKGROUND OF THE INVENTION

Antifriction bearings of the generic type have an outer ring and an inner ring with rolling bodies, preferably balls, which roll between them. The rolling bodies are positioned by a rolling body cage. Here, the rolling body cage is formed from a solid annular part with rolling body pockets made radially in it. Annular parts of this type have a comparatively high mass moment of inertia, the acceleration and deceleration forces of which in the case of changing relative speeds between the outer and inner rings have to be applied by the rolling bodies. Here, in particular, high wear occurs on the rolling body pockets.

In the case of reduced mass annular parts for what are known as "outer land guided" rolling body cages with an annular part width which decreases over the axial extent of the annular part, in which annular parts the rolling body cage is guided on that side of the rolling bodies which faces away from the contact angle at the radially greater diameter, that is to say at the broader part of the annular part, considerable friction occurs as a result of churning losses which are caused by a blockade of the lubricant flow.

Although what are known as "inner land guided" rolling body cages with an annular part, in which a cage guiding face is guided on the side which faces the contact angle at the radially smaller diameter, exhibit lower churning losses, the spatially constricted region for the guidance of the rolling body cage is constricted here, with the result that the rolling body cage tends to tilt and can cause nonround running of the antifriction bearing.

Annular parts for increasing the cage guiding face with an asymmetrical construction have therefore been proposed, in which the plane of the rolling body center points is displaced in the axial direction, with the result that two annular sections with different faces are formed, of which faces the larger is used as cage guiding face. This promises quieter running of the antifriction bearing, it being necessary to accept churning losses which are dependent on viscosity and speed as a result of the enlarged cage guiding face, which churning losses can be considerable depending on the flooding of the bearings with lubricants.

Furthermore, DE 103 43 881 A1 discloses a rolling body cage with a cage guiding face which is guided on the side which faces away from the contact angle at the greater diameter of the outer ring. Here, depressions which receive lubricant are provided on the guide face. As a result of the small supporting surface area of the cage guiding face, tilting of the rolling body cage and therefore nonquiet running of the antifriction bearing occur, in particular in high rotational speed applications such as turbochargers. Furthermore, the churning losses are high as a result of the rolling body cage which is arranged obliquely with respect to the rotational axis. On account of their lack of depth, the disclosed channels are not suitable for damping the rolling body cage with respect to the outer ring. Damping of the rolling body cage is not possible and also not provided in the disclosed angular contact ball bearing system as a result of the restricted cage guiding face.

OBJECT OF THE INVENTION

Proceeding from the prior art, an antifriction bearing is to be proposed for a rapidly rotating application, for example in turbochargers or fast running motor spindles, which antifriction bearing permits exact guidance of the rolling body cage with low churning losses; the rolling body cage is to be designed with optimized friction and is to have radial damping.

DESCRIPTION OF THE INVENTION

According to the invention, an antifriction bearing is provided, in particular for a turbocharger or other rapidly running applications such as motor spindles or the like, having an outer ring with an annular inner face and an inner ring with an outer face which is parallel to the inner face and a rolling body cage. Here, the rolling body cage comprises a single annular part which is arranged radially between the outer ring and the inner ring with in each case one cage guiding face which is parallel to the inner face of the outer ring and an inner surface which is parallel to the outer face of the inner ring, and with closed rolling body pockets which are distributed over the circumference and rolling bodies which are received in the rolling body pockets, with the result that the annular part is shown simply as a body which is designed substantially as a tubular section and into which the rolling body pockets are made radially. Here, in order to produce a sufficient cage guiding face, the rolling body cage is of asymmetrical configuration in such a way that the annular part is formed from two axial annular sections which are arranged along a plane which is drawn through the center points of the roiling bodies and runs perpendicularly with respect to the rotational axis of the antifriction bearing, the cage guiding face being provided on the axially broader annular section. With regard to the two end sides of the annular part, the rolling bodies are therefore displaced axially out of the center onto the end face which is the end side which does not belong to the cage guiding face. Here, the end side of the cage guiding face can be guided as far as the end face of the antifriction bearing. In order to achieve a friction-optimized and radially damped action of the annular part via the cage guiding face with respect to the inner face of the outer ring, at least one recess is provided outside the rolling body pockets, as a result of which a lubricating film is formed between the cage face and the inner face, which lubricating film, in interaction with the at least one recess, brings about hydraulic damping in the case of radial oscillations between the outer ring and the annular part, with the result that the antifriction bearing has increased running smoothness with reduced friction.

In order to receive a lubricant amount relevant for damping, the recesses are distributed over the full surface area of the ball guiding face and have a sufficient depth. Here, the recesses are designed according to the requirements and can assume a multiplicity of forms. They can already be made during the production of the annular part or subsequently, inter alia depending on the material of the annular part, for example plastic, metal or ceramic, in different production processes such as drilling, erosion, injection molding, punching, forging and the like.

According to one advantageous group of exemplary embodiments, the at least one recess can be produced from at least one groove. For example, one or more annular grooves can be provided which are spaced apart from one another axially, are arranged in parallel or cross one another. The annular grooves can be routed over the circumference in an arcuate, angular or polygonal manner or in another way. The cross section of the annular groove or of the annular grooves can be, for example, triangular, polygonal or rounded. The damping behavior of annular grooves of this type is particularly advantageous, since a friction can be set by means of the recesses in the form of one or more annular grooves, in a linear manner to the cage guiding face or the axial width of the cage guiding face, the hydraulic damping being active superlinearly with respect to the cage guiding face or its axial width.

As an alternative or in addition, grooves can be provided which are not configured as annular grooves, but rather are at an angle not equal to 90° with respect to the rotational axis. Specifically, these grooves can be axial grooves which are correspondingly oriented parallel to the rotational axis. All angles are possible between them, it being possible for all the grooves to have the same orientation over the circumference. As an alternative, grooves with different angles can be arranged in an alternating manner or in turns over the circumference. The grooves can also be configured to be elongate or polygonal or as a free form with regard to their surface. In the same way, the surface area of the grooves, the output depth and/or the cross section of the grooves can be varied.

The grooves can extend between the two end sides of the annular part. As an alternative, an extent can be provided exclusively over the axial region of the cage guiding surface. To this end, at least one groove can open at least into a rolling body pocket and optionally extend as far as that end side of the annular part which is assigned to the cage guiding face. Here, grooves can be received on different circumferences of the rolling body pockets. For example, a groove can open into a rolling body pocket in an angular range between an angle which is perpendicular with respect to the tangent of the circumference of the rolling body pocket and a tangential angle of the circumference. Different opening angles can be provided, for example, alternately over the circumference of the annular part.

In one special embodiment, circular blind bores can be provided in accordance with the grooves, for example by drilling, over the circumference of the ball guiding face. Furthermore, the at least one recess can be provided as an alternative or in addition to the grooves or blind bores in the form of apertures which are produced over the entire thickness of the annular part. The following comments which make reference to the apertures with regard to the arrangement of the latter are also valid in the same way for blind bores.

Here, the apertures can be configured in the annular part, in particular in the annular section with the cage guiding face, to be circular, polygonal or as a free form and are correspondingly drilled, punched or are produced in an off-tool manner, for example by means of an injection molding process. Here, a plurality of apertures are preferably arranged regularly distributed over the circumference. According to one advantageous exemplary embodiment, the apertures can be provided as broken-out parts from the end side of the ball guiding face. As an alternative or in addition, the apertures can be arranged in such a way that center points of the apertures and center points of the rolling body pockets are arranged in each case on an identical circumference of the annular part. Here, the diameters of the apertures are preferably smaller than the diameters of the rolling body pockets. Furthermore, each rolling body pocket does not necessarily have to be assigned an aperture on an identical circumference.

According to a further advantageous exemplary embodiment, the apertures can be arranged in such a way that center points of the rolling body pockets and center points of the apertures alternate with one another over the circumference and the circumferences of rolling body pockets and apertures intersect axially. This represents an arrangement, in which the apertures are arranged in each case in an imaginary triangle between two rolling body pockets and a segment of the end side which is assigned to the cage guiding face.

It goes without saying that the different forms of the proposed recesses can be combined with one another. For example, apertures can be arranged distributed over the circumference along one or more annular grooves.

BRIEF DESCRIPTION OF THE DRAWINGS

In the following text, the antifriction bearing according to the invention is explained in greater detail using the exemplary embodiments which are shown in FIGS. 1a to 9d, in which:

FIGS. 2a to 2f show a rolling body cage with embodiments of the apertures which are modified in comparison with FIGS. 1a to 1c;

FIG. 3 shows a rolling body cage with recesses in the form of blind bores;

FIGS. 4a and 4b show a rolling body cage with broken-out parts which are provided on the end side;

FIGS. 5a and 5b show a rolling body cage with an annular groove;

FIGS. 6a and 6b show a rolling body cage with an annular groove and superimposed apertures which are distributed over the circumference;

FIGS. 7a and 7b show a rolling body cage with two annular grooves which are spaced apart from one another axially;

FIGS. 8a and 8b show a rolling body cage with at least one axial groove; and

FIGS. 9a to 9d show different embodiments of a rolling body cage with oblique grooves.

DETAILED DESCRIPTION OF THE DRAWINGS

Figures 1A, 1B:
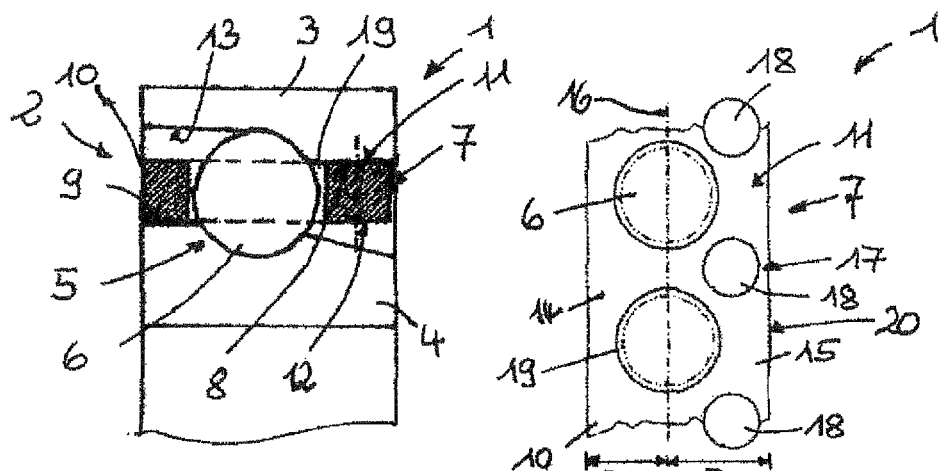
FIG. 1a shows an antifriction bearing according to the invention having a rolling body cage with apertures which are arranged between the antifriction bearing pockets, in partial section.
FIG. 1b shows the rolling body cage of FIG. 1a in a partial flat projection.

FIG. 1a shows a section of the upper half of an antifriction bearing 1 according to the invention which is configured as an angular contact ball bearing 2. Rolling bodies 5 are arranged as balls 6 over the circumference of the antifriction bearing 1 between the outer ring 3 and the inner ring 4 and are positioned by the rolling body cage 7 in rolling body pockets 19 which are cut out of the rolling body cage 7 and are distributed over the circumference. The outer ring 3 has an inner face 8 and the inner ring 4 has an outer face 9, which faces are arranged parallel to one another and coaxially with respect to a rotational axis of the angular contact ball bearing 2. The rolling body cage 7 is arranged between them as a single-part annular part 10 with an inner surface 12 and a cage guiding face 11 which is parallel and coaxial with respect to the inner face 8 and the outer face 9, the cage guiding face 11 and the inner surface 12 likewise being arranged coaxially with respect to one another, with the result that the annular part has the form of a tubular section.

The annular part 10 forms the cage guiding face 11 with respect to the inner face 8 of the outer ring 3. Here, the cage guiding face 11 is arranged on that side of the outer ring 3 which faces the contact angle, the inner face 8 and therefore the cage guiding face 11 having a smaller radius than the radius of the ball guiding face 13 of the outer ring 3. The annular part 10 therefore forms an "inner land guided" rolling body cage 7.

In order to secure the latter against tilting, the cage guiding face 11 is extended axially, as is apparent from the partial flat projection of the rolling body cage 7 of FIG. 1b. This arises from a division of the annular part 10 into two annular sections 14, 15, which division becomes clear from the plane 16 which is drawn through the center points of the balls 6 and lies perpendicularly with respect to the rotational axis of the rolling body cage 7 and the antifriction bearing 1 (FIG. 1a). Here, the axial width $D_1$ of the annular section 15 which forms the cage guiding face 11 is greater than the axial width $D_2$ of the annular section 14. The asymmetrical arrangement of the balls 6 in the annular part 10 achieves a considerable increase in the axial overlapping of the cage guiding face 11 with the inner face 8 (FIG. 1a), with the result that the tendency of the annular part 10 to tilt with respect to the former is eliminated or at least reduced.

The friction between the cage guiding face 11 and the inner face 8 (FIG. 1a) which is increased by the axial widening of said cage guiding face 11 is reduced again by recesses 17 being provided in the annular section 15, which recesses 17 are formed in the exemplary embodiment shown by circular apertures 18 in the annular part 10 which are distributed over the circumference. In the exemplary embodiment shown, the apertures 18 are arranged in an alternating manner over the circumference between the rolling body pockets 19, the diameters of the rolling body pockets 19 and the apertures 18 intersecting axially, with the result that the apertures 18 are arranged in each case in clearances between two rolling body pockets 19 and the end side and the end side 20 of the annular part.

The recesses 17 (in the form of the apertures 18 here) receive corresponding amounts of lubricant depending on the degree of filling of the antifriction bearing with lubricant and, in addition to the friction-reducing effect, act as hydraulic damping between the outer ring 3 (FIG. 1a) and the annular part 10 in the case of a radial relative movement between them, by the lubricant which accumulates being displaced and flowing back again.

Figure 1C:
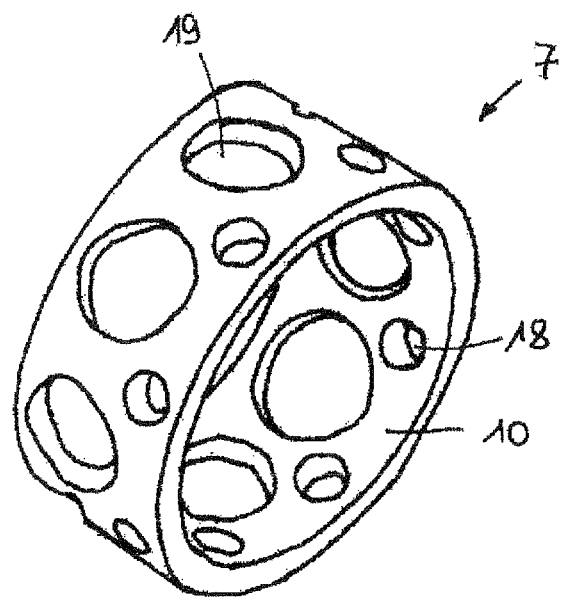
FIG. 1c shows the rolling body cage of FIGS. 1a and 1b in an elevation.

FIG. 1c shows the rolling body cage 7 of FIGS. 1a and 1b in perspective. The annular part 10 is configured in one piece in the form of a tubular section and can be produced from metal or plastic. Accordingly, the rolling body pockets 19 and the apertures 18 are punched from the radial outside or are already provided in an off-tool manner during a production operation by means of an injection molding process.

FIG. 2a shows a cross section through an angular contact ball bearing 2a which is only indicated and, apart from the design of the rolling body cage 7a, may correspond to the angular contact ball bearing 2 of FIG. 1a. As is apparent from the partial section illustration of FIG. 2a, the recesses 17a are formed by apertures 18a in the annular part 10a, the center points of which are arranged on the same circumference as the center points of the rolling body pockets 19.

The partial section illustration of the rolling body cage 7a results in a plurality of arrangement options of the apertures 18a which are shown in the following text in FIGS. 2b to 2f using partial flat projections. To this end, FIG. 2b shows the annular part 10a with circular apertures 18a, each rolling body pocket 19 being assigned in each case one aperture 18a which has a small diameter in comparison with the diameter of the rolling body pockets 19. In FIG. 2c, the apertures 18b are of polygonal configuration, here of square configuration. In FIG. 2d, the apertures 18c have a polygonally irregular shape, the form of which may be adapted, for example, according to a preferred exchange of lubricant. FIG. 2e shows apertures 18a, 18b which alternate over the circumference. In addition to the apertures 18a, 18b of FIG. 2e, FIG. 2f shows apertures 18d which are similar to the apertures 18 of FIGS. 1b and 1c and have a smaller diameter in the exemplary embodiment shown and are not arranged centrally between the rolling body pockets 19, but rather are closer to a rolling body pocket 19.

FIG. 3 shows one exemplary embodiment of an annular part 10b, in which, in contrast to the recesses 17a, no apertures are provided. Rather, the recesses 17b are formed as blind bores 21 which are arranged in a corresponding manner to the apertures 18a. It goes without saying that blind bores 21 and apertures of the preceding Figures may be mixed with one another and may be exchanged for one another.

FIGS. 4a and 4b show the annular part 10c in partial section and a partial flat projection with recesses 17c which are formed by cutouts 22 which are distributed over the circumference and form an open structure with the end side 20 of the annular part 10c. In the exemplary embodiment shown, the cutouts 22 are provided in a circular fashion with a center point on the circumference of a center point of a rolling body pocket 19. In further modifications, the cutouts may be arranged in a different form and/or offset in the circumferential direction with respect to the center points of the rolling body pockets 19.

FIGS. 5a and 5b show an annular part 10d with a recess 17d which is configured as an annular groove 23. The annular groove 23 is arranged axially between the end side 20 and the rolling body pockets 19.

FIGS. 6a and 6b show an annular part 10e, in which, in addition to the annular groove 23 on its annular plane, apertures 18e are provided which are distributed over the circumference, are of circular configuration here and the diameter of which is greater than the groove width of the annular groove 23.

FIGS. 7a and 7b show an annular part 10f with two annular grooves 23a which are spaced apart from one another axially and are arranged in a corresponding manner to the annular groove 23 of FIGS. 6a, 6b.

FIGS. 8a and 8b show an annular part 10g with recesses 17e which are configured in the form of axial grooves 24. Starting from the end side 20 of the annular part 10g, they are directed toward the center point of rolling body pockets 19 and are distributed over the circumference. Here, the number can be selected in such a way that only part of the rolling body pockets 19 are connected to an axial groove. Furthermore, in terms of number and arrangement over the circumference, the axial grooves 24 may be provided in a modified way.

Figure 9B:
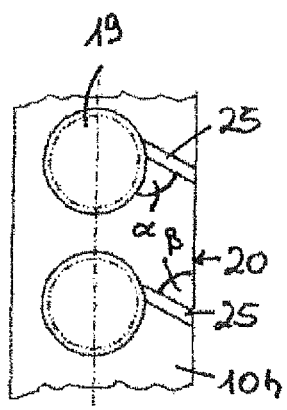
Figure 9C:
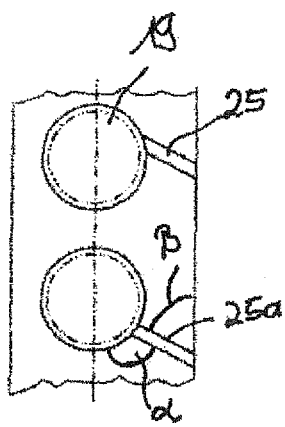
Figure 9D:
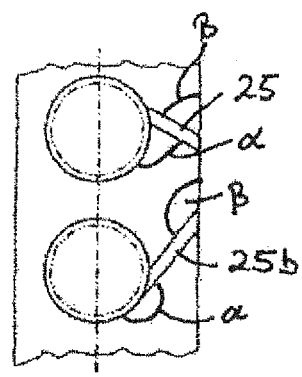

FIG. 9a shows a partial section through an annular part 10h, in which the recess 17e is formed by oblique grooves 25 which are distributed over the circumference and have an angle of greater than 0° and less than 90° with respect to the rotational axis of the antifriction bearing. According to the selection of exemplary embodiments shown in the partial flat projections of FIGS. 9b to 9d, arrangement options of the oblique grooves 25 are shown. Starting from the end side 20 of the annular part 10h, FIG. 9b shows oblique grooves 25 which are oriented eccentrically toward the rolling body pockets 19 and, in each case at an identical pitch α with respect to the rolling body pockets 19 and in each case at an identical pitch β with respect to the end side 20, are arranged over the circumference. In FIG. 9c, in contrast to this, oblique grooves 25a are alternated with the oblique grooves 25, which oblique grooves 25a, although they have an identical pitch β, open at another position on the rolling body pockets and therefore have a modified pitch α. In FIG. 9d, in contrast, oblique grooves 25 alternate with oblique grooves 25b over the circumference, in the case of which both pitches α, β are different.

It goes without saying that the combination of any recesses in the form of apertures, blind bores and grooves is encompassed by the concept of the invention.

LIST OF DESIGNATIONS

1 Antifriction bearing
2 Angular contact ball bearing
2a Angular contact ball bearing
3 Outer ring
4 Inner ring
5 Rolling body
6 Ball
7 Rolling body cage
7a Rolling body cage
8 Inner face
9 Outer face
10 Annular part
10a Annular part
10b Annular part
10c Annular part
10d Annular part
10e Annular part
10f Annular part
10g Annular part
10h Annular part
11 Cage guiding face
12 Inner surface
13 Ball guiding face
14 Annular section
15 Annular section
16 Plane
17 Recess
17a Recess
17b Recess
17c Recess
17d Recess
17e Recess
18 Aperture
18a Aperture
18b Aperture
18c Aperture
18d Aperture
18e Aperture
19 Rolling body pocket
20 End side
21 Blind bore
22 Cutout
23 Annular groove
23a Annular groove
24 Axial groove
25 Oblique groove
25a Oblique groove
25b Oblique groove
α Pitch
β Pitch
$D_1$ Axial width
$D_2$ Axial width

The invention claimed is:

1. An antifriction bearing for a turbocharger, comprising: an outer ring with an annular inner face; an inner ring with an outer face which is parallel to the inner face; and a rolling body cage comprising a single annular part which is arranged radially between the outer ring and the inner ring with, in each case, one cage guiding face which is parallel to the inner face of the outer ring and an inner surface which is parallel to the outer face of the inner ring, and with closed rolling body pockets which are distributed over a circumference and rolling bodies which are received in the rolling body pockets, wherein a plane drawn through center points of the rolling bodies and running perpendicularly with respect to a rotational axis of the antifriction bearing divides the annular part into two axial annular sections, one of the two axial annular sections being an axially broader annular section having an axial width that is greater than an axial width of the other of the two axial annular sections, the cage guiding face being provided on the axially broader annular section and the cage guiding face having at least one radial recess outside the rolling body pockets and the axially broader annular section being damped hydraulically with respect to the outer ring by means of the at least one recess.

2. The antifriction bearing of claim 1, wherein the at least one recess is at least one groove.

3. The antifriction bearing of claim 2, wherein the at least one groove is at least one annular groove which is arranged over the circumference of the cage guiding face.

4. The antifriction bearing of claim 3, wherein the at least one groove is an oblique groove which is arranged on the cage guiding face along an angle with respect to the rotational axis, which angle is greater than 0° and less than 90°.

5. The antifriction bearing of claim 2, wherein the at least one groove is at least one axial groove.

6. The antifriction bearing of claim 5, wherein at least one of the grooves is arranged between an end side of a ball guiding face and the rolling body pocket.

7. The antifriction of claim 5, wherein a plurality of identical or non-identical grooves are arranged over the circumference.

8. The antifriction bearing of claim 7, wherein at least two oblique grooves impinge on the respective circumference of the rolling body pocket at an identical or different angle of attack.

9. The antifriction bearing of claim 1, wherein the at least one recess contains blind bores which are distributed over the circumference of the cage guiding face.

10. The antifriction bearing of claim 1, wherein the at least one recess is formed from apertures of the annular part which are distributed over the circumference.

11. The antifriction bearing of claim 10, wherein the apertures are configured to be at least one of polygonal and round.

12. The antifriction bearing of claim 10, wherein the at least one recess is provided as cutouts from an end side of the cage guiding face.

13. The antifriction bearing of claim 10, wherein center points of the apertures and center points of the rolling body pockets are arranged, in each case, on an identical circumference of the annular part.

14. The antifriction bearing of claim 10, wherein the center points of the rolling body pockets and center points of the apertures alternate with one another and the circumferences of rolling body pockets and apertures overlap axially.

* * * * *